(12) United States Patent
Kirkpatrick, Jr. et al.

(10) Patent No.: US 6,435,069 B1
(45) Date of Patent: Aug. 20, 2002

(54) ROTARY DIE CUTTING COVER

(75) Inventors: Alan D. Kirkpatrick, Jr.; Christopher D. Kirkpatrick, both of Basking Ridge, NJ (US)

(73) Assignee: IAM Corporation, Basking Ridge, NJ (US)

( * ) Notice: Subject to any disclaimer, the term of this patent is extended or adjusted under 35 U.S.C. 154(b) by 0 days.

(21) Appl. No.: 09/448,548

(22) Filed: Nov. 23, 1999

(51) Int. Cl.$^7$ ............................... B26D 7/20; B28B 1/20
(52) U.S. Cl. ..................... 83/698.42; 83/659; 76/107.1; 76/DIG. 3; 76/DIG. 6; 264/311; 492/45; 492/48
(58) Field of Search ............................. 83/659, 698.42; 492/22, 48, 45; 76/107.1, DIG. 3, DIG. 6; 264/310, 311, 312

(56) References Cited

U.S. PATENT DOCUMENTS

| | | | |
|---|---|---|---|
| 3,274,873 A | | 9/1966 | Sauer ........................... 83/347 |
| 3,602,970 A | | 9/1971 | Smith ........................... 492/22 |
| 3,633,246 A | * | 1/1972 | Kirkpatrick ............... 83/659 |
| 3,765,329 A | * | 10/1973 | Kirkpatrick et al. ...... 83/659 X |
| 3,885,486 A | * | 5/1975 | Kirkpatrick et al. .......... 83/659 |
| 4,004,479 A | | 1/1977 | Bodnar ......................... 83/345 |
| 4,031,600 A | | 6/1977 | Whigham .................... 492/48 |
| 4,073,207 A | | 2/1978 | Kirkpatrick .................. 83/659 |
| 4,073,208 A | | 2/1978 | Kirkpatrick .................. 83/659 |
| 4,191,076 A | * | 3/1980 | Bollmer et al. ........... 83/659 X |
| 4,848,204 A | | 7/1989 | O'Connor et al. ............ 83/659 |
| 4,867,024 A | | 9/1989 | Cho et al. ..................... 83/659 |
| 5,076,128 A | | 12/1991 | O'Connor et al. ............ 83/659 |
| 5,078,535 A | * | 1/1992 | Kirkpatrick ............... 83/659 X |
| 5,202,076 A | * | 4/1993 | Carlstrom ............... 264/311 X |
| 5,224,408 A | * | 7/1993 | Steidinger ............ 83/698.42 X |
| 5,532,282 A | * | 7/1996 | Needham ................ 264/310 X |
| 5,536,352 A | * | 7/1996 | Zeman et al. ................ 156/242 |
| 5,677,022 A | * | 10/1997 | Zeman et al. .............. 428/34.1 |
| 5,720,212 A | | 2/1998 | Kirkpatrick .................. 83/659 |
| 5,758,560 A | | 6/1998 | Fiscus .......................... 83/659 |
| 5,833,898 A | * | 11/1998 | Dutt ....................... 264/310 X |
| 5,906,149 A | * | 5/1999 | Montenegro Criado ...... 83/659 |
| 5,916,346 A | * | 6/1999 | Neal ............................ 83/659 |
| 6,135,002 A | * | 10/2000 | Neal ............................ 83/659 |

FOREIGN PATENT DOCUMENTS

| | | |
|---|---|---|
| GB | 1300112 | 3/1970 |
| GB | 1572242 | 9/1976 |

* cited by examiner

*Primary Examiner*—Charles Goodman
(74) *Attorney, Agent, or Firm*—Hale and Dorr LLP

(57) ABSTRACT

A cover for a rotary die is centrifugally cast with multiple layers to substantially eliminate stress when the cover is cast in an arcuate shape for use in a die cutting system. A locking mechanism attached to ends of the cover is designed to be convenient to install on and remove from a cutting cylinder.

19 Claims, 4 Drawing Sheets

ROTARY DIE CUTTING COVER

BACKGROUND OF THE INVENTION

This invention relates to cutting covers, locking mechanisms for such covers, and methods for making a cutter cover.

In certain types of known cutting systems, a workpiece is drawn between a first cylinder and a second cylinder. The first cylinder has cutting teeth mounted on it, so that when it rotates, the teeth cut into the workpiece. In order to ensure that the cutting extends all the way through the workpiece, the second cylinder, which rotates about an axis parallel to the axis of the cutting first cylinder, is mounted so that its circumference is near the blade. The second cylinder is covered by a protective cover (sometimes called a blanket) into which the teeth penetrate, so that the teeth clearly pass through the workpiece. The cover should be made of a material that can recover from the penetration of the teeth for at least some period of time. Covers and cutters of this general type are described in a number of patents, including U.S. Pat. Nos. 5,720,212; 5,758,560; 5,076,128; and 4,867,024.

Rotary die cutting covers are typically made by casting an elastomer, such as urethane, in an oversized mold that has a sheet of steel as a backing and aluminum end pieces. The casting is mounted on a rotating cylinder and ground down to size. Such a process wastes material and is labor intensive. The steel backing is designed to give stability to the urethane and to inhibit variations with thermal change. When the elastomer cools after the casting process, however, the elastomer shrinks. Variations in cooling can cause serious problems if the manufacture and use of the cover are performed under different conditions. While steel is desirable in some respects because it has a low thermal variation and is resilient, there are also drawbacks to its use. The urethane is cast onto the steel at a temperature of about 220° F. (105° C.). Thermal shrinkage for urethane due to the polymerization process is slight, but the shrinkage from 220° F. (105° C.) down to room temperature is significant, and causes the urethane to pull back. Because the urethane is bonded to the sheet of steel and the steel does not have large thermal variation, the two materials create stress that can be visible in the way the cover is shaped after it is cured. The cover may be cast in an arc, but it winds up flat after curing and cooling. At room temperature, it acts much like a bimetallic strip does, i.e., by bending towards the more thermally affected and therefore smaller material. The stresses on the cover also create a surface stress on the cover, causing cuts made in the material during operation to widen and tear more easily, and thus requiring more frequent replacement.

The cover is passed around the second cylinder, then forced to bend into a circle. The two ends of the cover are mounted in an axial slot in the cylinder where the ends are locked together. Since the urethane is stressed from a flat state into a circular state, force needs to be applied to keep the cover on the cylinder. This force becomes evident in the design of a lock in the slot for holding the cover on the cylinder. The lock requires so much material interference in order to assure that the cover will not open during use, that it may be difficult to use. Moreover, access to the second cylinder is often difficult, and the time involved to mount and remove the covers can thus be significant. The machines on which the covers are used are usually run continuously, and downtime is very undesirable in the cutting industry.

The ends of the locks can be bolted together. There are also a number of approaches for boltless locking, such as U.S. Pat. Nos. 5,720,212, 5,758,560, and 5,076,128. Each of these boltless locks requires a step or shoulder between male and female pieces such that one of the pieces is rotated under the other into place. Such locking mechanisms, after being locked in a slot, are difficult to unlock.

SUMMARY OF THE INVENTION

The present invention includes a cover, a process for forming a cover, a locking mechanism for a cover, methods for locking a cover, and cutting systems including such a cover and locking mechanism.

In one aspect, the invention includes a process of making a multi-layer cover with stresses that balance out and create a cover that, once post cured, is still curved into an arc. The curved cover makes easier mounting, removal, and use.

The process for making the cover includes centrifugally casting (also known as spin casting) a cover, preferably with three layers. An outer layer is a resilient and recoverable material such as urethane, a middle layer has higher durometer but lower cure temperature than the outer layer, such as a woven glass fiber with an encapsulating material to create a matrix with the glass fiber. A tougher, more resilient inner layer of material is cast over the middle layer to prevent cracking or breakage of the middle layer. This inner layer material has a high tensile strength with higher durometer than the outer material. The materials and the thicknesses of those materials are chosen so that the stresses balance each other, so that the cover is created with any desired arc or curve such that the arcuate shape is maintained. For example, the inner layer has greater shrinkage than a thicker outer layer. This arcuate shape is preferably nearly a full circle, e.g., about 340° or more, and it maintains its shape at rest.

The spin casting process includes providing a material in a molten form into a centrifuge with a mold to form a desired shape. The material and mold are spun, e.g., at 500–750 RPM. Additional materials can be added after a time to a multi-layered structure.

In another aspect, the invention includes a multi-layered rotary die cover that has an outer material that can be cut into and yet provide some recovery from the penetration of the teeth; a middle layer more rigid than the outer layer and having a relatively low elongation percentage and a higher durometer than the outer layer; and inner layer with a high tensile strength and also with a higher durometer than that of the outer layer. The cover is formed to have little stress so that it stays in a curved or arcuate shape when made and at rest.

In another aspect, the invention includes a locking mechanism for connecting ends of a cover over a cylinder. The locking mechanism includes a male portion at a first end of a cover and a female portion at second end of the cover (or possibly an end of a separate cover). The female portion has one side connected to the second end and a mating portion extending away from the second end. This mating portion includes a pivotable tang that allows the male portion to be snap fit into place by being moved substantially only radially and without requiring that the male and female portions be rotated relative to one another. The male portion, when snap fit into place, is substantially immovable in a radial direction and is rigidly held by the tang to prevent wear.

The female portion preferably has an axial slot for receiving a deformable member that is between the female portion and the radial side of slot in the cylinder. The deformable member provides for improved rigidity in the slot in a circumferential direction, while not providing any force on a radial or axial direction.

For holding the cover to the male and female portions, the cover preferably has monolithic members in the cover extending toward the locking mechanism pieces. The members are preferably T-shaped and the locking member portions each have slots with tabs for receiving the T-shaped portion to substantially prevent movement in the circumferential or radial directions.

The present invention also includes methods for attaching and detaching the locking mechanism where a male portion of the locking mechanism can be snap fit with substantially only radial movement. The male portion is conveniently removed by prying back the tang so that the male portion can pop out.

By providing a cover with less stress in the die cutting section of the cover, there is better cut and tear resistance. The locking mechanism of the present invention allows for more convenient attachment and detachment of the cover from the cylinder, thus reducing the amount of down time when the cover needs to be replaced. Other features and advantages will become apparent from the following description of preferred embodiments, drawings, and claims.

DESCRIPTION OF PREFERRED EMBODIMENTS

Figure 1:
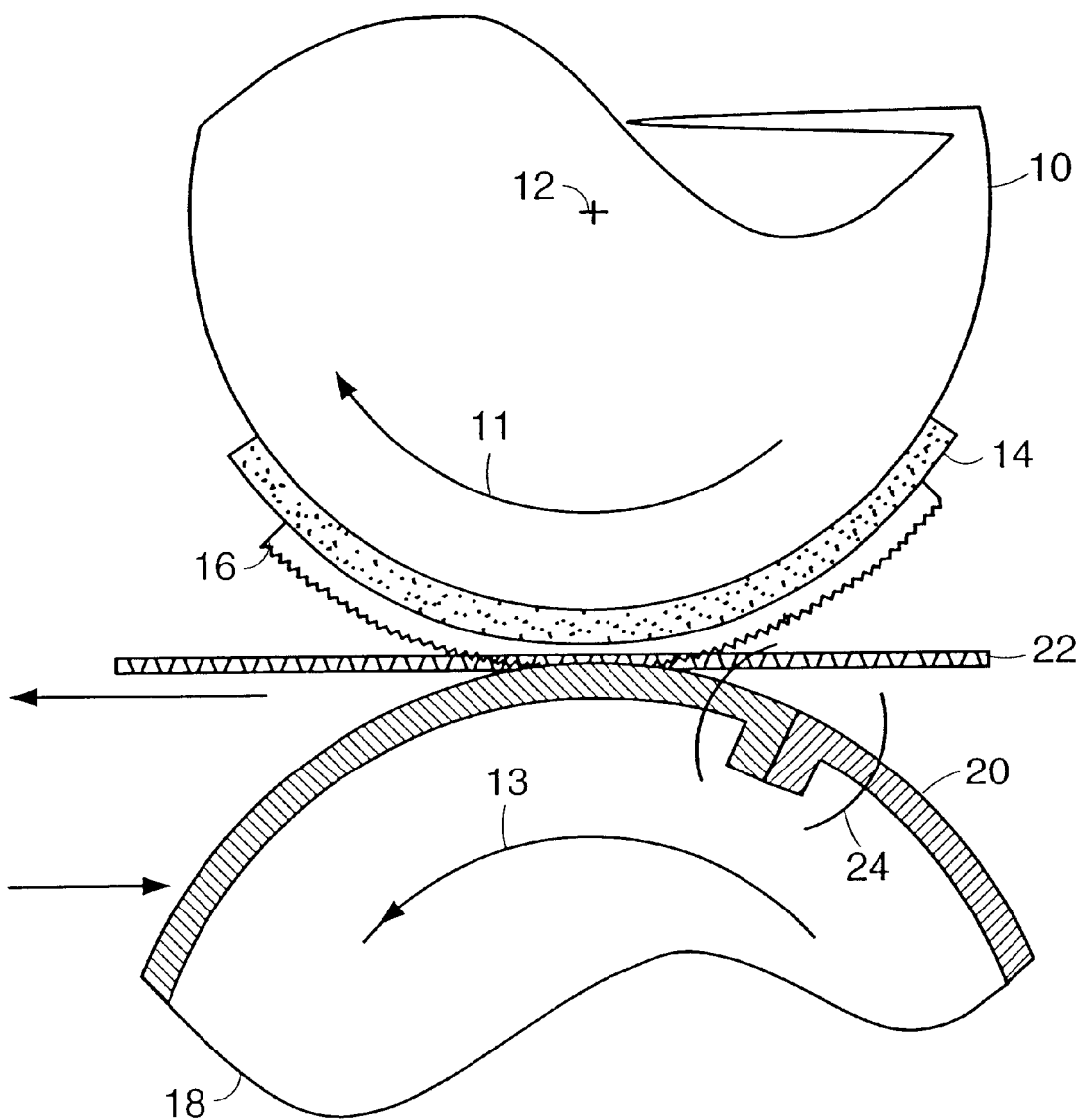
FIG. 1 is a cross-sectional view of a cutting cylinder, an anvil cylinder, and a workpiece.

Referring to FIG. 1, a die cylinder 10 rotates clockwise in a circumferential clockwise direction 11 about an axis 12. Mounted on cylinder 10 is a die board 14, on which a serrated cutter 16 is mounted. An anvil cylinder 18 rotates in a circumferential counter-clockwise direction 13 about a central axis (not shown) that is parallel to and spaced from axis 12.

A polyurethane blanket cover 20 (shown in simplified form here but in more detail in FIG. 2) is mounted over cylinder 18. Cutter 16 cuts a workpiece, such as a corrugated board 22, as board 22 passes between cylinders 10, 18. For cutter 16 to fully cut corrugated board 22, the teeth of cutter 16 should pass completely through board 22 and into blanket cover 20. Urethane is known as a good material for a cover, due to its high cut and tear resistance as well as its healing properties once it is cut. The resilience of the material for cover 20 allows for repeated cutting on the same surface without a significant degradation of the surface.

Cylinder 18 has an axially oriented channel 24 that is parallel to the axis of cylinder 18. Opposite ends of cover 20 are coupled with a locking mechanism in channel 24 to hold the cover around cylinder 18. There could be one such channel and a single cover piece, or multiple channels, cover pieces, and locking mechanisms. This locking mechanism is shown in more detail in FIGS. 2–5.

Figure 2:
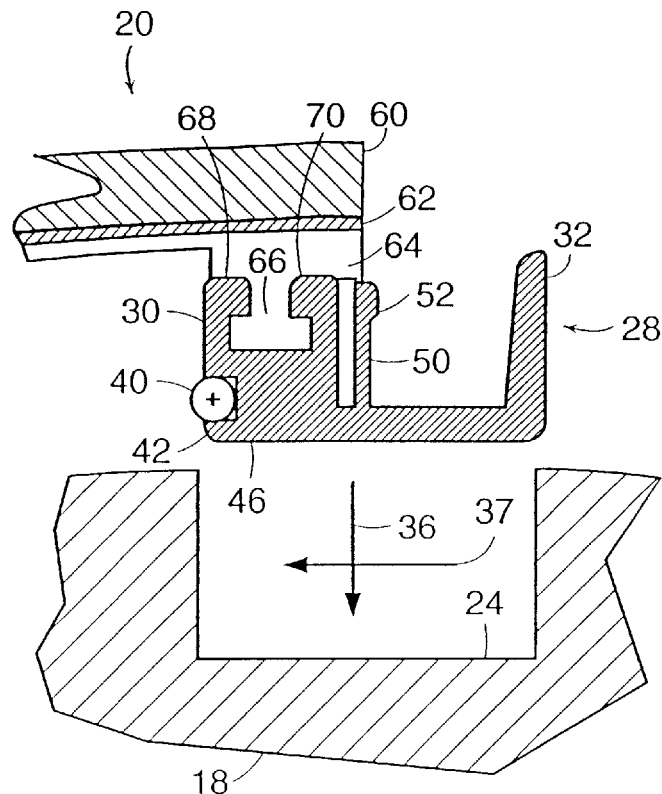
FIGS. 2 and 3 are cross-sectional views of a female portion of a locking mechanism with a cover shown outside and mounted in a slot in an anvil cylinder.
Figure 3:
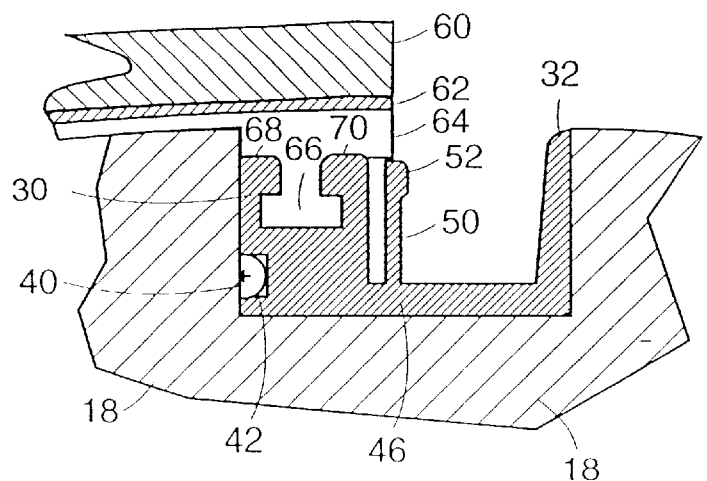

FIGS. 2 and 3 show a female portion 28 of a locking mechanism for mounting in channel 24 of cylinder 18. Cover 20 is brought around the cylinder, and portion 28 is aligned with channel 24. Portion 28 has a first side 30 and a second side 32 that are against the axial sides of channel 24. Portion 28 is driven into channel 24 in a radial direction 36. This may be done with a small dead blow mallet.

A small compressible strip 40 is in an axially oriented slot 42 in side 30 of female portion 28. The compression of strip 40 creates a frictional fit in the slot, thereby holding portion 28 firmly when it is driven into channel 24. This compressive strip acts as an "O" ring seal deforming horizontally as it is compressed, without deforming or creating pressure radially. Thus the force is in a circumferential direction 37 transverse to both radial direction 36 and the axial direction. This non-vertical deformation helps portion 28 remain seated once driven down, and not be pulled up off the bottom of the slot.

Portion 28 has a bottom wall 46 that seats in channel 24 and up from which sides 30 and 32 extend. Between and parallel to sides 30 and 32, a tang 50 extends up from bottom wall 46. Tang 50 is connected only at bottom wall 46 to allow tang 50 to have a small amount of pivoting about bottom wall 46. At the top of tang 50 is a latch portion 52 with a greater thickness than the rest of tang 50.

FIGS. 2 and 3 also show the multiple layers of cover 20. Cover 20 is a multi-layer structure with an outer layer 60 of a TDI-polyester prepolymer, such as Airthane® PST-90A, a polyurethane distributed by Air Products and Chemicals, Inc. Outer layer 60 should have good cut and tear resistance and a durometer of about 85–92 (Shore A). The specific material recited here is commonly used in the rotary die cutting industry.

A middle layer 62 has a higher durometer, lower cure temperature, higher tensile strength, lower elongation break, and higher flex modules than outer layer 60. One material that can be used is a woven fiberglass, encapsulated with a material such as Royalcast 3153, available from Uniroyal Chemical. This particular material has a Shore D hardness of 84 at 68° F. (note that Shore D values are about 40–45 "points" below Shore A values, so a lower Shore D value can have greater hardness than a higher Shore A value), linear shrinkage of 2%, and tensile strength of 10,000 PSI. The encapsulating material bonds the glass fiber to the other layers. This bonding thereby inhibits thermal variation due to the drop off in temperature from the casting process, by the thermal stability formed by the glass. This material also has a lower curing temperature at 120° F., thereby allowing some normalization of the covers shape during the curing process and allowing for some relief of stress of the two outer materials.

Inner layer 64 is a tough material with high tensile strength (which may be between the tensile strength of the inner and outer materials), and higher durometer than the outer material (although it may be lower than the middle layer), PET-75D, a TDI-PTMEG prepolymer from Air Products and Chemicals, Inc., or LF31D from Uniroyal Chemical are each suitable. This particular material has a Shore D hardness of 75, and tensile strength of 9500 PSI.

Inner layer 64 has a monolithic portion shaped to form a close fit with portion 28 without using bolts. Portion 28 has a first tab 68 extending from side 30, and a second tab 70 spaced from and facing tab 68 and located between side 30 and tang 50. Inner layer 64 is molded to have a monolithic T-shaped portion 66 with a post that extends between tabs 68, 70 of portion 28. Inner layer 64 thus does not move relative to portion 28 in the radial or circumferential direction.

Figure 4:
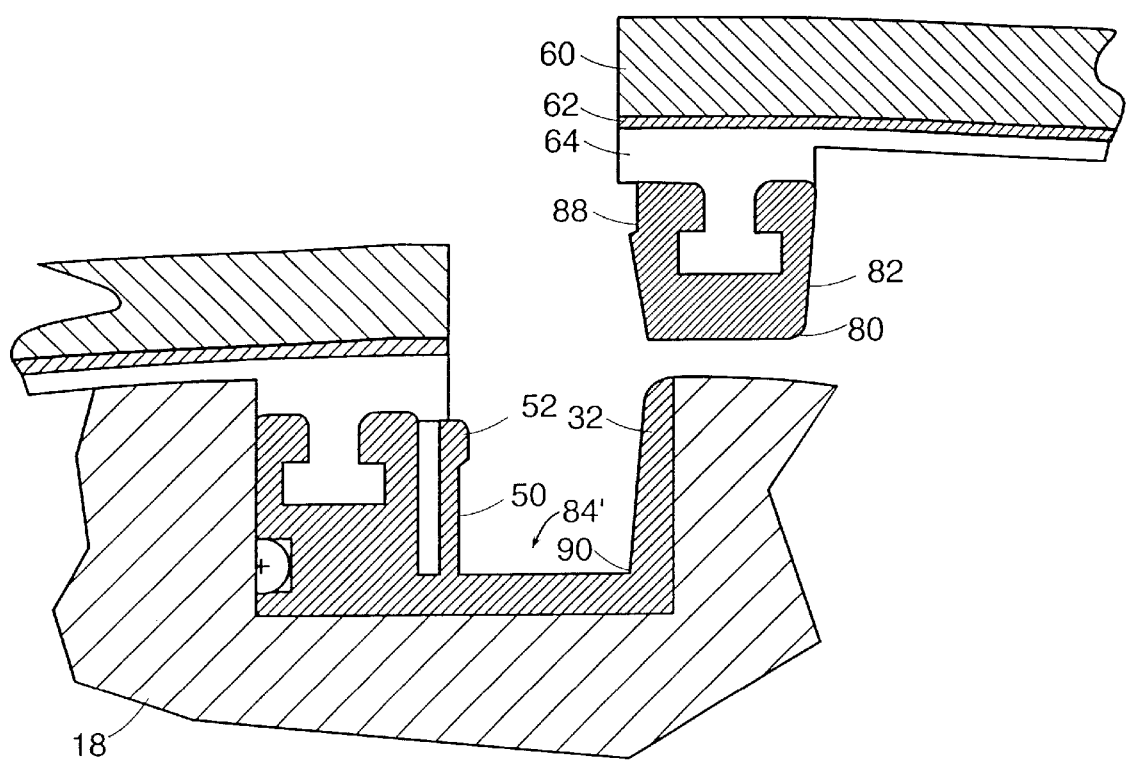
FIG. 4 shows the female portion in the channel of the cylinder and a male portion of the locking mechanism.
Figure 5:
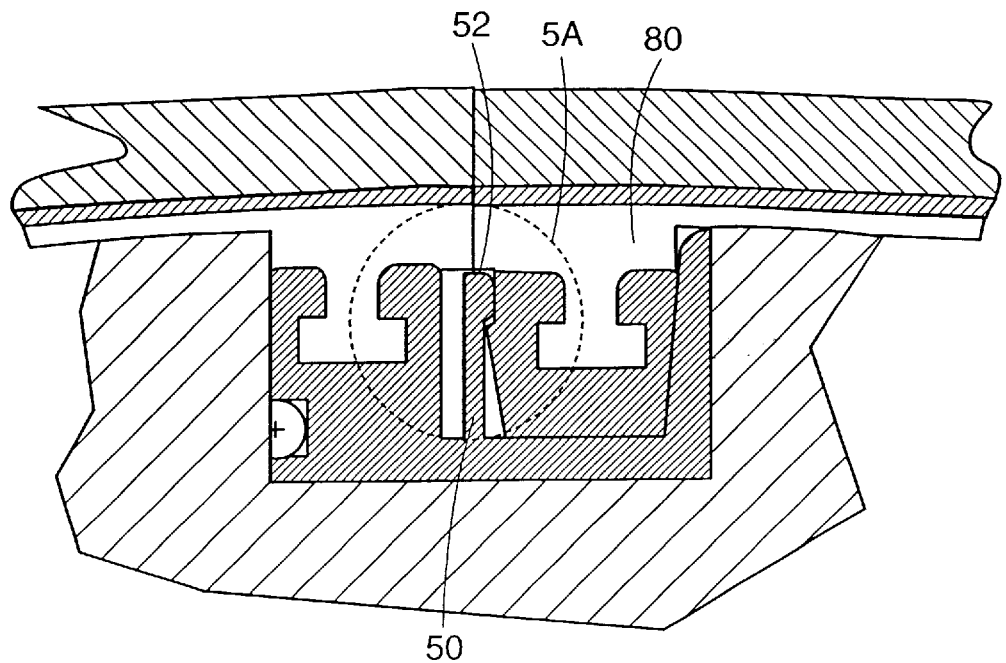
FIG. 5 is a cross-sectional view of the interaction between the male and female portions of the locking mechanism, including a close up view of the connection.
Figure 5A:
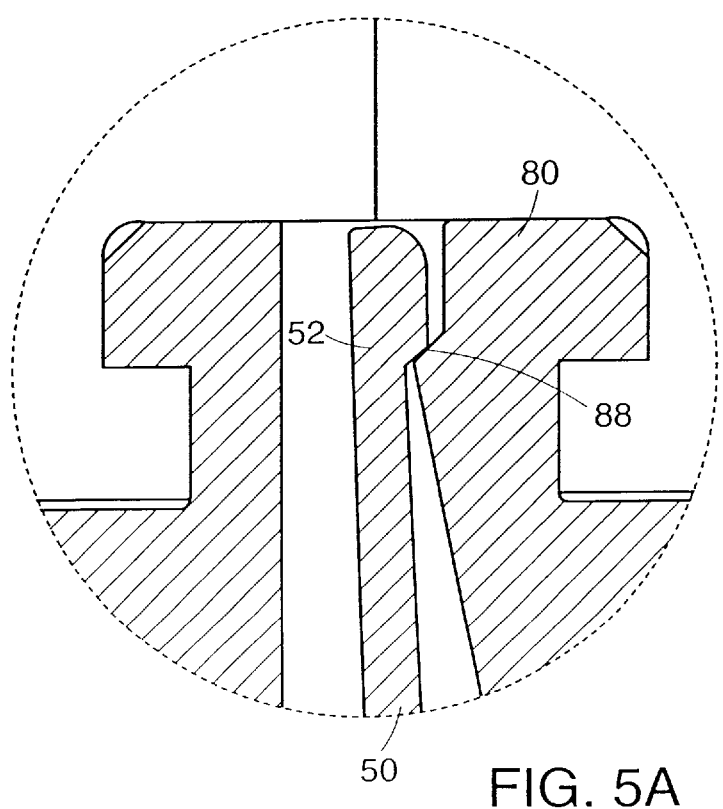

Referring to FIGS. 4 and 5, a male portion 80 is brought around cylinder 18 to engage female portion 28, shown already seated in channel 24. An edge 82 of portion 80 is placed against side 32 of portion 28 to slide into cavity 84 between tang 50 and side 32. Male portion 80 can be tapped down with substantially only radial motion to slide along side 32 of portion 28. When the male portion is tapped in, the ends of the cover one bought together with substantially no gap. Portions 28 and 80 are preferably aluminum or some other material with a low coefficient of friction to make such sliding easier. As portion 80 is seated (FIG. 5), a lip 88 of portion 80 engages tang 50, which pivot slightly to allow the oversize situation created by lip 88. Once lip 88 has passed the greatest compression of the tang, portion 80 seats in the bottom of portion 28 and keeps the tang engaged. The male portion is preferably designed not to extend under the end of the cover that is attached to the female portion, and therefore it need not be rotated relative to the female portion when mounting. To remove, the male portion only needs to be pried to clear the tang, after which it can be pulled out easily.

The two mating faces of tang 50 and lip 88 are situated so that the tang provides substantial fractions of its force in the radial and circumferential directions, e.g., at about a 45° angle relative to radial and tangential directions. This relationship causes a force to be directed from the tang in a horizontal plane, as well as a vertical plane, thereby pinning a back corner 90 of portion 80 into a corner created by the vertical element of portion 28 on the side of the slot. This positioning is significant because portions 80 and 28 may experience as many as 1 million compressions on the cylinder, with the cutting teeth of the upper cylinder wearing away the urethane, and creating a highly destructive environment. It is thus desirable to prevent portion 80 from being allowed to move even slightly because such movement could wear the lip of portion 80, and or the tang of portion 28, allowing for the release of the lock.

Male portion 80 is connected to cover 20 with a similar monolithic T-shaped post in cover 20 as that for connection to the female portion. Male portion 80 has a similar channel that has two tabs for mating with the downwardly directed post from cover 20. As with female portion 28, the cover is held rigidly in the radial and circumferential directions.

The male and female portions can be conveniently extruded from aluminum with little post-processing. In the present form of the lock, the only post-extrusion processing is creating the slot next to the tang.

Referring again to the aspect of the cover and its manufacture, the process for making the cover includes centrifugal (spin) casting of the material for the outer layer of the cover; providing a layer of woven glass fiber over an inner diameter of this outer layer; and casting a rigid material to encapsulate the glass fiber. The rigid material has a low elongation percentage, as well as a high durometer. This rigid material creates a matrix with the glass fiber, encapsulating it and bonding it to the other materials. This bonding thereby inhibits the thermal variation due to the drop off in temperature from the casting process, by the thermal stability formed by the glass. A tougher, more resilient material is cast over the rigid material to prevent cracking or breakage of the intermediary material. This material has a high tensile strength, with a slightly lower durometer. The thickness and shrinkage of the layers are controlled to produce a desired final shape of the cover. Essentially, the inner material can compensate for whatever force of shrinkage that the outer material introduces. Ultimately, it is desirable to have stresses balance out so that the cover maintains an arcuate shape, nearly full circle, when at rest. As a result, there is less work in bending the cover to conform to the cylinder.

Centrifugal casting is a casting process in which a long, hollow tubular mold, partially closed at the ends, is lined with a centrifugally applied material, which is subsequently dried and cured. The lined mold is spun rapidly about its central axis. The material is poured into the spinning mold and spinning continued until the material solidifies. The centrifugal action can assist in the purification of the material by forcing less dense materials to the inside. The casting solidifies from the outside and the inner surface feeds the necessary material to the remainder of the casting as required. The resulting piece has a smooth outer surface that may not need further machining. By using such cylindrical casting with a mold, multi-layer covers can be made, and there is not the same excess and waste of materials as provided in typical molding processes in which the cover needs to be machined.

In one example of a suitable process, the centrifugal caster is spun at about 500–750 RPM at 220° F. (105° C.) while the outer layer material is introduced into a mold. After spinning, e.g., about 4 minutes, a fiberglass layer is unrolled around the inner diameter. The outer layer at this point should be solid but tacky. The middle layer material is introduced and the caster is spun for several minutes. Next an inner layer material is introduced and the caster is spun for several more minutes to produce the multi-layer structure. Next, a lug mold is put in the caster and more of the inner layer material is introduced. This mold creates the T-shape described above and makes the T-portion monolithic with the inner layer. The cover is demolded and post-cured, e.g., 1–16 hours at 220° F. (105° C.).

The resulting cover can be 0.3 inches, of which about 0.2 inches is the outer layer, 0.03 the middle layer, and 0.07 the inner layer.

The materials and the thicknesses for those materials are chosen so that the resulting cover has little stress when in an arcuate shape similar to the shape it will have when mounted over a cylinder. Preferably the cover is in an arc at least 270°, and more preferably at least 340°, and thus holds that shape after it is manufactured. With other materials and thicknesses, there may be some experimentation to get the desired result.

Having described preferred embodiments of the present invention, it should be apparent that modifications can be made without departing from the scope of the invention as defined by the appended claims. Moreover, while some components are described as having certain advantages, the claims should not be limited to components necessarily having each of those advantages.

What is claimed is:

1. In a die cutting system having a cutting blade and a cylinder opposing the blade so that a workpiece is cut between the cutting blade and the cylinder, the cylinder having a central axis, a radial direction relative to the central axis, and an axially oriented channel with first and second sides, an assembly comprising:

a cover for receiving the cutting blade as the blade passes through a workpiece; and a locking mechanism connected to the cover for locking ends of the cover together when inserted in the axially oriented channel in the cylinder, the locking mechanism including a unitary first member having:

a first sidewall for positioning against the first side of the channel, a second side wall for positioning against the second side wall of the channel, a bottom wall which, with the first and second side walls, forms a U-shape within the axial channel, and a tang extending upwardly from, and pivotable relative to, the bottom wall, the tang being between the first and second side walls to define with one of the first and second side walls a receiving channel.

2. The assembly of claim 1, the locking mechanism further including a second member coupled to a second end of the cover and sized to fit in the receiving channel such that when inserted in the receiving channel, the second member causes the tang to pivot away relative to the bottom wall until fully inserted when the tang presses against the second member.

3. The assembly of claim 2, wherein the tang has a wider thickness portion at an upper end away from the bottom wall, and the second member has a notch, such that when the second member is inserted in the receiving channel, the upper end of the tang engages the notch to prevent the second member from moving outwardly in the radial direction.

4. The assembly of claim 3, wherein the wider thickness portion of the tang and the notch meet at an angle of about 45 degrees relative to the radial direction when the cover is mounted on the cylinder.

5. The assembly of claim 2, wherein the first member has an axial slot in the first side wall facing the first side of the axial channel, the assembly further comprising a deformable material in the axial slot for creating a frictional fit in a circumferential direction but substantially no force in the radial direction when the locking mechanism is mounted in the axial channel.

6. The assembly of claim 3, wherein the first and second members are made of metal, such that an interface between the tang and the second member is metal-to-metal.

7. The assembly of claim 6, wherein the metal for each of the first and second members is aluminum.

8. The assembly of claim 3, wherein the tang and second member are interconnected such that the second member can be released from the lock by pivoting the tang away from the second member.

9. The assembly of claim 1, wherein the cover includes:
a first layer made of a material having a durometer of 85–92;
a second layer against the first layer, the second layer of a material having a higher durometer than the first material; and
a third layer over the second layer made of a material different from the first and second materials and having a higher durometer than the first material.

10. The assembly of claim 9, wherein the cover has an arcuate shape of nearly a circle when at rest.

11. The assembly of claim 10, wherein the cover has an arc of at least about 270°.

12. The assembly of claim 9, wherein the first layer is made of urethane.

13. The assembly of claim 9, wherein the second layer includes encapsulated woven fiberglass.

14. The assembly of claim 10, wherein the cover has an arc of at least 340°.

15. The assembly of claim 1, wherein the cover is formed by centrifugally casting a first material to produce a first layer of the cylinder cover.

16. The assembly of claim 15, wherein the first material includes urethane.

17. The assembly of claim 15, wherein the first material has a durometer of 85–92.

18. The assembly of claim 15, wherein the cover is further made by centrifugally casting against the first layer a second material with a higher durometer than a durometer of the first material to produce a multi-layered structure with the first layer and a second layer.

19. The assembly of claim 18, wherein the cover is further made by casting against the second layer a third material different from the first and second material to produce a third layer, the third material having a higher durometer than the first material.

* * * * *